United States Patent [19]

Suzuki et al.

[11] Patent Number: 4,934,157
[45] Date of Patent: Jun. 19, 1990

[54] APPARATUS FOR CONTROLLING A VARIABLE DISPLACEMENT REFRIGERANT COMPRESSOR FOR A CAR AIR-CONDITIONER

[75] Inventors: Shinichi Suzuki; Isao Takanashi, both of Kariya, Japan

[73] Assignee: Kabushiki Kaisha Toyoda Jidoshokki Seisakusho, Aichi, Japan

[21] Appl. No.: 237,153

[22] Filed: Aug. 26, 1988

[30] Foreign Application Priority Data

Aug. 28, 1987 [JP] Japan .................... 62-216199

[51] Int. Cl.$^5$ ................................. F25B 1/00
[52] U.S. Cl. ..................... 62/228.5; 62/229; 62/243
[58] Field of Search ........... 62/226.4, 228.5, 228.1, 62/243, 244, 239, 229, 226, 227; 165/42, 43; 236/78 D, 1 EA

[56] References Cited

U.S. PATENT DOCUMENTS

| | | | |
|---|---|---|---|
| 4,325,426 | 4/1982 | Otsuka et al. | 236/78 D |
| 4,510,764 | 4/1985 | Suzuki | 62/228.5 |
| 4,649,709 | 3/1987 | Kagohata et al. | 236/78 D |
| 4,662,185 | 5/1987 | Kobayashi et al. | 62/228.4 |
| 4,702,677 | 10/1987 | Takenaka et al. | 417/222 |
| 4,747,754 | 5/1988 | Fujii et al. | 417/222 |

Primary Examiner—Harry B. Tanner
Attorney, Agent, or Firm—Burgess, Ryan & Wayne

[57] ABSTRACT

An apparatus for controlling a displacement changing unit of a variable displacement type refrigerant compressor arranged in a car air-conditioner circuit, including a refrigerant evaporator for cooling air for air-conditioning a compartment of a car, is provided with a temperature detecting device for detecting an actual temperature of the air for air-conditioning the car compartment, a temperature setting switch for setting a desired temperature of the air for air-conditioning the car compartment, a unit for generating an electric signal indicating a change in an operating condition of the air blowing fan of the refrigerant evaporator, a control unit for carrying out a PID control to control the operation of the displacement changing unit of the compressor in response to a difference between the actual and desired temperatures and a signal of a unit for generating an electric signal indicating a change in the operating condition of the air blowing fan, to thereby eliminate the difference between the desired and actual air temperatures while suppressing hunting which causes a change in the actual temperature of the air, for air-conditioning the car compartment during the control operation of the control unit.

10 Claims, 5 Drawing Sheets

APPARATUS FOR CONTROLLING A VARIABLE DISPLACEMENT REFRIGERANT COMPRESSOR FOR A CAR AIR-CONDITIONER

BACKGROUND OF THE INVENTION

1. Field of the Invention

The present invention relates to a car air-conditioner having a variable displacement refrigerant compressor, and more particularly, to a control apparatus for controlling the displacement of a continuously variable displacement type refrigerant compressor of the car air-conditioner.

2. Description of the Related Art

In a car air-conditioner with a variable displacement type refrigerant compressor, control of the displacement of the compressor, especially a continuously variable displacement wobble plate type refrigerant compressor, in accordance with a change in a refrigerating load in the air-conditioning circuit, in which one or more pressure responsive control valves accommodated in the compressor are used for automatically controlling the displacement changing mechanism of the compressor is known (e.g., U.S. Pat. No. 4,702,677).

Another car air-conditioner employing a variable displacement wobble plate type compressor having a solenoid-operated displacement changing unit (U.S. Pat. No. 4,747,754) is known in which a control unit including an electronic microcomputer or a microprocessing unit (CPU), and temperature sensors for sensing a temperature of an air discharged from an evaporator in the circuit and an actual temperature in a car compartment to be air-conditioned, are employed for electrically controlling the operation of a solenoid-operated displacement changing unit in the variable displacement refrigerant compressor. In this system, the CPU controls the solenoid-operated displacement changing unit of the compressor to control a PID motion, on the basis of the temperature detected by the temperature sensors to thereby obtain a desired temperature of the air discharged from the evaporator or a desired temperature of the car compartment.

During the control of the operation of the solenoid-operated displacement changing unit of the variable displacement wobble plate type compressor by the PID controlling motion, however, often a large oscillatory change occurs in a temperature of the air discharged from the evaporator or a temperature in the car compartment, to a point both higher and lower than the desired temperature, i.e., hunting occurs to cause a change in the controlled temperature. Accordingly, a satisfactory air-conditioning is not obtained, and the driver and passengers of the car are made uncomfortable.

SUMMARY OF THE INVENTION

An object of the present invention is to eliminate the above-mentioned defect encountered by the conventional car air-conditioner employing a continuously variable displacement type refrigerant compressor and a CPU controller.

Another object of the present invention is to provide a control unit for controlling the displacement of a continuously variable displacement refrigerant compressor for an air-conditioner under an optimum control condition in response to a change in the operating condition of the air-conditioner.

A further object of the present invention is to provide a car air-conditioner with a variable displacement wobble plate type compressor, capable of providing a desired air-conditioning which will ensure the comfort of a person or persons riding in the car.

In accordance with the present invention, there is provided an apparatus for controlling a displacement changing unit of a variable displacement type refrigerant compressor arranged in a car-air-conditioner circuit, including a refrigerant evaporator for cooling air for air-conditioning a compartment of a car, which comprises:

a temperature detecting unit for detecting an actual temperature of the air for air-conditioning the compartment of the car;

a temperature setting unit for setting a desired temperature of the air for air-conditioning the compartment of the car;

a unit for generating an electric signal indicating a change in an operating condition of the air-conditioner circuit; and a control unit connected to the temperature detecting unit, the temperature setting unit, and the unit for generating an electric signal indicating a change in an operating condition of the air-conditioner circuit, and provided with a control signal generating unit for generating an electric control signal for controlling the operation of the displacement changing unit of the variable displacement refrigerant compressor, to thereby control the displacement of the variable displacement refrigerant compressor until the actual temperature of the air detected by the temperature detecting unit becomes substantially the same as the desired temperature of the air as set by the temperature setting unit, wherein the control unit comprises:

a hunting detecting unit for detecting an occurrence of hunting by which a change in the temperature of the air for air-conditioning the compartment of the car from the temperature of the air detected by the temperature detecting unit is caused;

a control mode changing unit for changing a first control mode in which the control signal generating unit generates a first drive signal to control the operation of the displacement changing unit of the variable displacement refrigerant compressor under a first predetermined control condition to a second control mode in which the control signal generating unit generates a second drive signal to control the operation of the displacement changing unit under a second predetermined control condition when the hunting detecting unit detects an occurrence of hunting; and a mode restoring unit for restoring the second control mode changed by the control mode changing unit to the first control mode when the control unit is supplied with an electric signal indicating a change in the operating condition of the air-conditioner circuit.

In a preferred embodiment, the variable displacement refrigerant compressor comprises a variable displacement wobble plate type compressor having a wobble plate assembly received in a crankcase chamber and changing the strokes of compression pistons in response to a change in a pressure level within the crankcase chamber, and a displacement changing means comprising a solenoid-operated control valve unit for changing the pressure level within the crankcase chamber.

DESCRIPTION OF THE DRAWING

Other objects, features and advantages of the present invention will be made more apparent from the ensuing description of the preferred embodiments of the present invention with reference to the accompanying drawings wherein.

DESCRIPTION OF THE PREFERRED EMBODIMENTS

Figure 1:
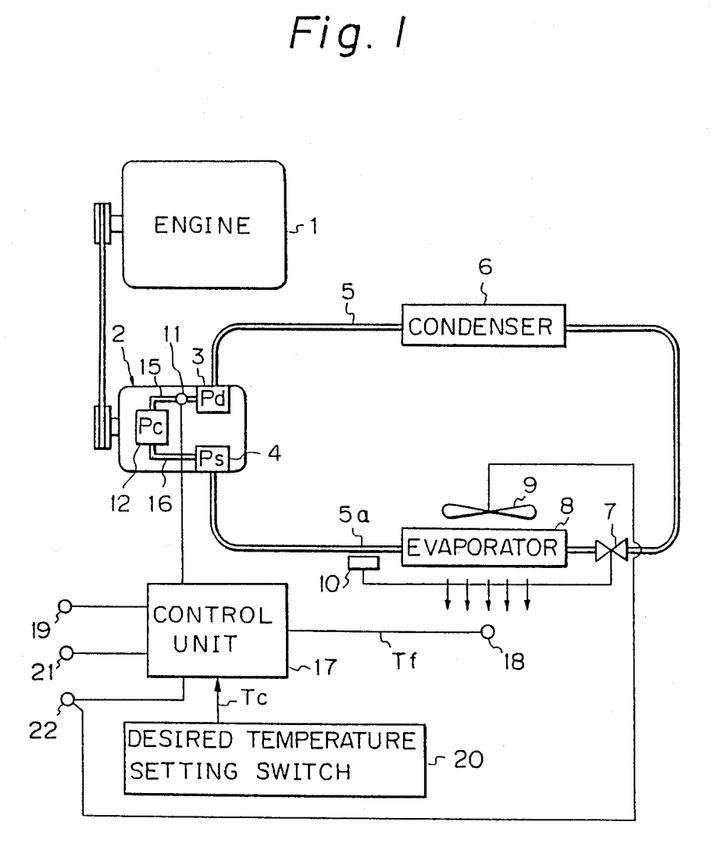
FIG. 1 is a schematic block diagram illustrating a closed refrigerant circuit of a car air-conditioner employing a variable displacement wobble plate type compressor and a displacement control apparatus according to an embodiment of the present invention.

Referring to FIG. 1, a car air-conditioner is provided with a closed refrigerant circuit consisting of an outer refrigerant conduit 5 in which a variable displacement wobble plate type refrigerant compressor 2 driven by a car engine 1, a refrigerant condenser 6, an expansion valve 7, and an evaporator 8 are arranged in series. The outer refrigerant conduit 5 extends from a discharge chamber 3 to a suction chamber 4 of the refrigerant compressor 2, and the refrigerant condenser 6 is connected to the delivery end of the compressor 2 to condense the compressed refrigerant from the compressor 2 and send the refrigerant after condensation to the expansion valve 7. The refrigerant passing through the expansion valve 7 is then sent to the evaporator 8 to cool air for air-conditioning the passenger compartment of a car, and after cooling the air, the refrigerant is returned to the suction end of the compressor 2. The evaporator 8 is provided with a blower fan 9 for blowing the air cooled by the evaporator 8 into the passenger compartment. A temperature sensing tube 10 is arranged on a conduit 5a, i.e., a portion of the refrigerant conduit 5 extending from the outlet end of the evaporator 8 to the suction end of the compressor 2, to detect the temperature and pressure of the refrigerant at the outlet end of the evaporator 8 and thereby control the degree of opening of the expansion valve 7.

Figure 2:
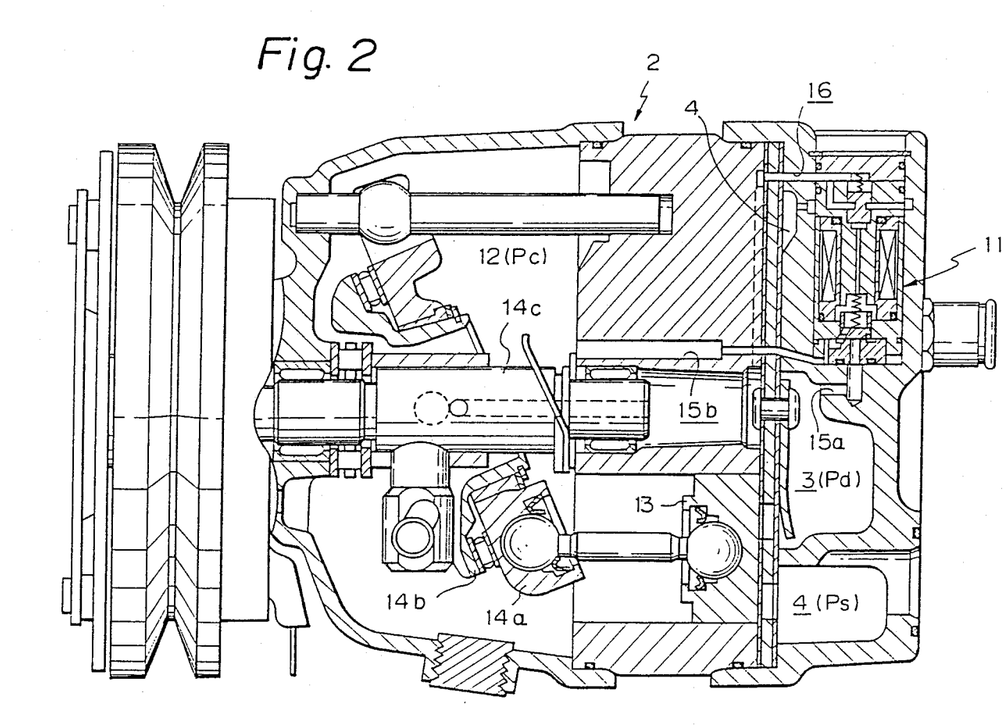
FIG. 2 is a longitudinal cross-sectional view of a variable displacement wobble plate type refrigerant compressor for use in the air-conditioner of FIG. 1.

As best illustrated in FIG. 2, the variable displacement wobble plate type compressor 2 is provided with a wobble plate-operated piston mechanism for compressing a refrigerant gas, and a solenoid-operated control valve 11 functioning as a displacement changing unit of the compressor 2. Namely, the solenoid-operated control valve 11 controls a pressure Pc in a crankcase chamber 12 in which the assembly of the non-rotary wobble plate 14a and a rotary drive plate 14b rotated by a drive shaft 14c is arranged. Due to the control of the pressure Pc in the crankcase chamber 12, the stroke of each of a plurality of pistons 13 is changed, and therefore, the angle of inclination of the wobble plate 14a from a position vertical to the axis of the drive shaft 14a is adjustably changed, and as a result, the displacement or the delivery capacity of the compressor is changed. The solenoid-operated control valve 11 comprises a valve element for opening and closing refrigerant passageways 15a and 15b connecting the discharge chamber 3 and the crankcase chamber 12, and a solenoid element for electro-magnetically moving the valve element between the open and closed positions when electrically energized and de-energized. The opening and closing of the refrigerant passageways 15a and 15b allows control of the amount of a high pressure refrigerant gas (pressure level: Pd) flowing from the discharge chamber 3 to the crankcase chamber 12, to thereby achieve the above-mentioned control of the pressure level Pc in the crankcase chamber 12. The energization and de-energization of the solenoid element of the solenoid-operated control valve 11 is conducted by controlling the duty ratio of an electric excitation current supplied to the solenoid element. Note, reference is herewith made to U.S. Pat. No. 4,747,754 to Fujii et al., with respect to the duty ratio control of the solenoid-operated control valve of the variable displacement wobble plate type compressor.

The afore-mentioned crankcase chamber 12 is always in fluid communication with a suction chamber 4 (pressure level: Ps), through a refrigerant passageway 16, and therefore, a blow-by gas from compression chambers to the crankcase chamber 12 is permitted to leak into the suction chamber 4, and thus an uncontrolled rise in the pressure level in the crankcase chamber 12 is prevented.

Referring again to FIG. 1, the solenoid-operated control valve 11 of the refrigerant compressor 2 is connected to a control unit 17 which generally includes a CPU, a ROM, and a RAM, and functions as a unit for determining whether or not hunting has occurred in the temperature of air sent from the evaporator 8, a unit for shifting the displacement control mode from an ordinary displacement control mode to a hunting suppression control mode, a unit for detecting a change in the operating condition of the air-conditioner in which the refrigerant compressor 2 is accommodated, and a unit for restoring the displacement control mode from the hunting suppression control mode to the ordinary displacement control mode. The control unit 17 also can function as a timer unit, and a unit for electrically controlling the operation of the solenoid-operated control valve 11, to thereby control the displacement of the refrigerant compressor 2.

A temperature detecting device 18 for detecting the actual temperature Tf of air blowing out of the evaporator 8 is connected to the control unit 17, and therefore, the control unit 17 detects a change in the temperature of air from the evaporator 8, through a temperature signal output by the temperature detecting device 18.

A separate temperature detecting device 19 is provided for detecting the temperature of air within the compartment of a car to be air-conditioned, and is also connected to the control unit 17, and therefore, the control unit 17 is able to detect a change in the temperature of air within the car compartment, through a signal output by the temperature detecting device 19.

A desired temperature setting switch 20 is provided to allow a car driver or passenger in the car to set a desired temperature Tc of air discharged from the evaporator 8, i.e., air used to air-condition the car compartment, at the control unit 17. This switch 20 is usually arranged on a control panel of the car and connected to the control unit 17, and accordingly, the control unit 17 determines the desired temperature Tc of the air within the car compartment, through a signal output by the desired temperature setting switch 20.

Figure 3:
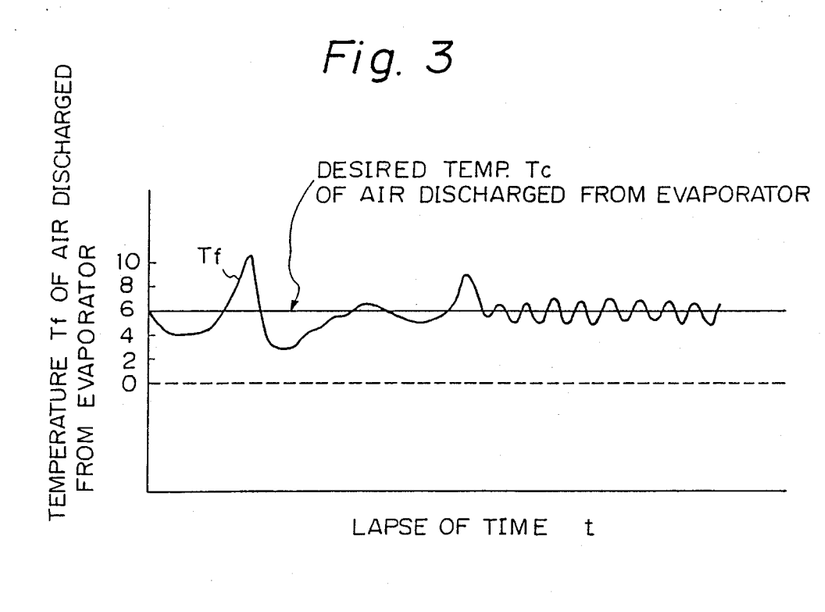
FIG. 3 is a time chart illustrating the transition of the temperature of air discharged from an evaporator of the air-conditioner.

Since the control unit 17 has determined the actual and the desired temperatures Tf and Tc of the air, through the signals output by the temperature detecting device 18 and the desired temperature setting switch 20, the unit 17 detects a difference between both temperatures Tf and Tc and changes the displacement of the variable displacement refrigerant compressor 2 by controlling the operation of the solenoid-operated control valve unit 11 of the compressor 2 until the actual temperature Tf of the air discharged from the evaporator (i.e., the temperature of the air within the car compartment) is the same as or close to the desired temperature Tc of the air, as illustrated in FIG. 3. Namely, the control unit 17 generates an electric control signal to control the operation of the solenoid-operated control valve 11. In the present embodiment, the electric control signal of the control unit 17 is generated in accordance with the well known PID (proportional+integral+differential) control theory.

In the PID control theory, a difference or an error between the actual temperature Tf of the air and the desired temperature Tc of the air is used as an input e(t) to obtain an output z(t), which becomes the above-mentioned electric control signal supplied to the solenoid-operated control valve 11 of the compressor 2. Accordingly, the output z(t) is represented by the equation (1) below, as a function of the input e(t).

$$z(t) = K_p \cdot e(t) + 1/T_I \int e(t) + T_D \cdot de(t)/dt \quad (1)$$

where $K_p$, $T_I$, and $T_D$ are settable values (control constants).

The above equation (1) per se is stored in the ROM of the control unit 17, and the calculation is carried out by the CPU of the unit 17.

The control unit 17 determines whether or not hunting has occurred, to cause a change in the temperature of the air within the car compartment, through the temperature signal output by the temperature detecting device 18. For example, in the present embodiment, the control unit 17 determines that hunting has caused a temperature change, when the unit 17 detects that the error between the actual and desired temperatures Tf and Tc exceeds ±1.5° C. When the control unit 17 detects the occurrence of the hunting, the unit 17 shifts from a usual displacement control mode in which the control of the displacement of the compressor 2 is carried out under usual conditions, where the constants $K_p$, $T_I$, and $T_D$ of the equation (1) are set as predetermined values of $K_p1$, $T_I1$, and $T_D1$, to a hunting suppression control mode in which the control of the displacement of the compressor 2 is carried out under a hunting suppression condition, where the constants $K_p$, $T_I$, and $T_D$ of the equation (1) are set as different values, i.e., $K_P2$, $T_I2$, and $T_D2$, selected beforehand as suitable for suppressing hunting and a resultant change in the air temperature. These two kinds of predetermined values of the constants $K_p$, $T_I$, and $T_D$ are previously stored in the ROM of the control unit 17, and are read out of the ROM when carrying out the calculation of the equation (1).

A switch 21 is provided for starting the air-conditioner, and is connected to the control unit 17. When the switch 21 is turned ON, a signal indicating a start of the air-conditioner is output to the control unit 17, and when the switch 21 is turned OFF, the output of a signal therefrom is stopped.

A blower regulating device 22 is provided by which the operation of the blower fan 9 can be manually regulated (the line extending from the device 22 to the blower fan 9 of FIG. 1) to thereby control the amount of cooled air discharged from the evaporator 8. The blower regulating device 22 is connected to the control unit 17 and outputs a signal thereto when the device 22 is operated to control the amount of cooled air discharged from the evaporator 8 by regulating the operation of the blower fan 9, and therefore, the control unit 17 is aware of the operating condition of the blower fan 9, and thus the operating condition of the air-conditioner per se.

The operation of the apparatus for controlling the solenoid-operated control valve of the present embodiment will now be described hereinbelow with reference to FIGS. 4 and 5, in addition to FIG. 1.

Figure 4:
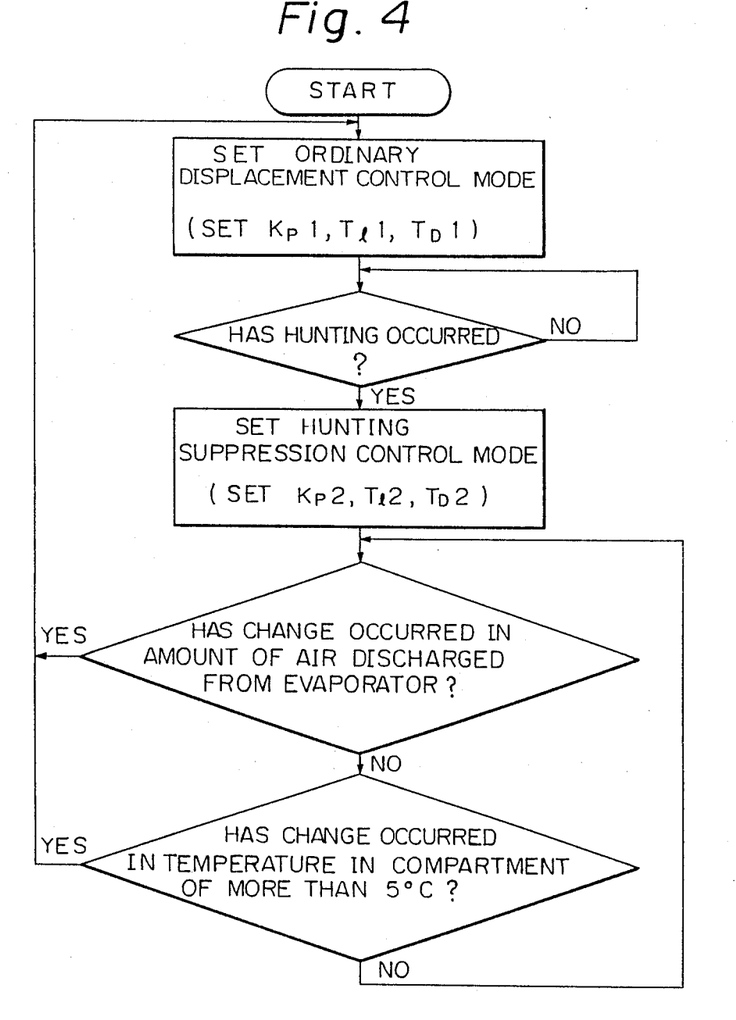
FIG. 4 is a flow chart of the operation of a displacement control apparatus for controlling the displacement of the variable displacement wobble plate type compressor of FIG. 2.
Figure 5:
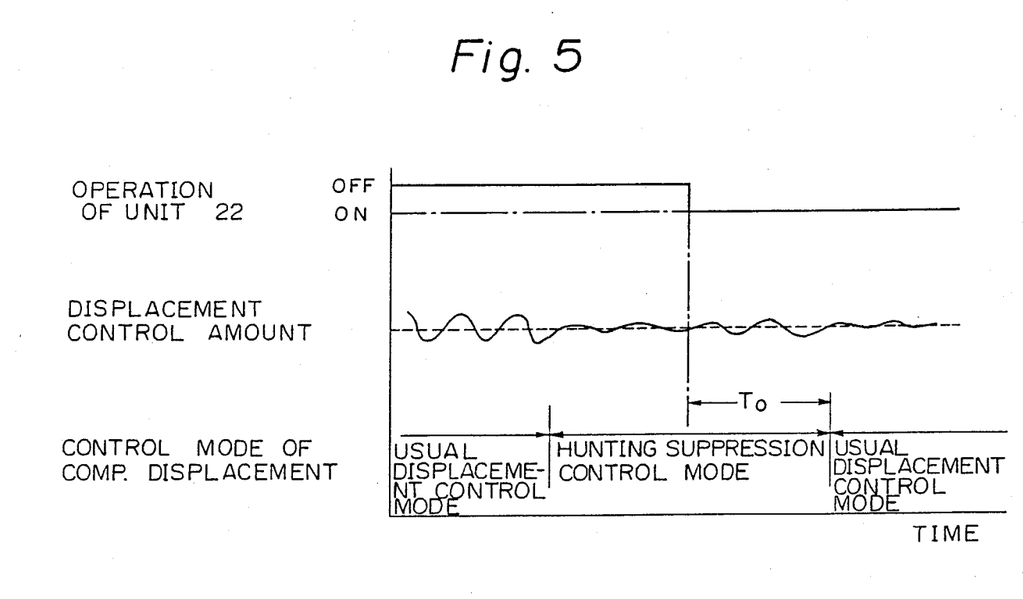
FIG. 5 is a time chart indicating the timing of a change in the control mode from an ordinary displacement control mode to a hunting suppression control mode.

When the control unit 17 detects that the switch 21 is turned ON, the unit 17 carries out the control process illustrated in FIG. 4. Namely, initially the control unit 17 sets the ordinary displacement control mode (sets the control constants of the equation (1) to the values $K_p1$, $T_I1$, and $T_D1$), and then controls the solenoid-operated control valve 11 of the compressor 2 in accordance with the PID control theory on the basis of a comparison of the actual air temperature Tf with the desired air temperature Tc, and as a result, the displacement of the compressor 2 is controlled and the required air-conditioning of the car compartment is carried out. When the air-conditioner is started, the rotation of the engine 1 is transmitted to the compressor 2 via a solenoid clutch (not illustrated in FIG. 1), and therefore, the refrigerant is pumped into and compressed by the compressor 2. The compressed refrigerant is delivered from the discharge chamber 3 through the conduit 5 to the condenser 6, where the compressed refrigerant is condensed. Thereafter, the condensed refrigerant is sent via the expansion valve 7 to the evaporator 8, where a thermal exchange occurs between the air and the refrigerant. The refrigerant after thermal exchange is then sent through the conduit portion 5a to the suction chamber 4 of the compressor 2, and the air cooled by the thermal exchange operation of the evaporator 8 is discharged into the car compartment by the blower fan 9, to air-condition the compartment.

The actual temperature Tf of the air in the compartment (i.e., the actual temperature of the air discharged from the evaporator 8) is constantly monitored by the temperature detecting device 18, and is transmitted to the control unit 17. Therefore, when the control unit 17 detects that an error between the desired air temperature Tc set by the desired temperature setting switch 20 and the above-mentioned actual air temperature Tf exceeds a predetermined limit, the unit 17 judges that hunting has occurred to cause a change in temperature of the air discharged from the evaporator 8. The control unit 17 then shifts from the usual displacement control mode to the hunting suppression control mode, and thus the control constants $K_p$, $T_I$, and $T_D$ of the equation (1) are set to the values $K_p2$, $T_I2$, $T_D2$. Thereafter, the control of the solenoid-operated control valve 11 of the compressor 2 is carried out by a control signal generated under the hunting suppression control mode.

Subsequently, when the control unit 17 detects a change in the amount of cooled air discharged from the evaporator 8 by the blower fan 9 due to a manual operation of the blower regulating device 22, the unit 17 starts a timer operation to measure a lapse of time. After the lapse of a predetermined time period $T_0$, as illustrated in FIG. 5, the control unit 17 shifts from the hunting suppression control mode to the usual displacement control mode. Namely, the control constants Kp, $T_I$, and $T_D$ of the equation (1) are restored to the values Kp1, $T_I$1, $T_D$1.

Similarly, during the hunting suppression control mode, when the control unit 17 detects that a change in the actual air temperature within the car compartment is more than 5° C. with respect to the desired air temperature within the car compartment, the unit 17 shifts from the hunting suppression control mode to the usual displacement control mode by resetting the control constants Kp, $T_I$, and $T_D$ to the values Kp1, $T_I$1, and $T_D$1, respectively.

As understood from the above description, the apparatus for controlling the operation of the displacement changing unit of the variable displacement refrigerant compressor according to the embodiment of the present invention operates to shift from the usual displacement control mode to the hunting suppression control mode when hunting occurs to cause a change in the temperature of the cooled air for air-conditioning a car compartment. Then, during the hunting suppression control mode, when the amount of cooled air discharged from the evaporator 8 is regulated by operation of the blower regulating device 22 or when the error of the actual air temperature within the compartment with respect to the desired air temperature within the compartment exceeds a predetermined value (i.e., 5° C.), the control unit 17 shifts from the hunting suppression control mode to the usual displacement control, mode (the control constants Kp, $T_I$, and $T_D$ of the equation (1) are changed), and accordingly, an optimum control of the air temperature for air-conditioning the car compartment can be achieved.

In the described embodiment, the temperature detecting device 18 for detecting the actual temperature of the air discharged from the evaporator 8 is used by the control unit 17 to detect the occurrence of hunting and a change in the temperature of air for air-conditioning a car compartment.

In a modified embodiment, the temperature detecting device 18 may be used to directly detect an actual temperature of air in a car compartment, and the detected actual temperature of the air in the car compartment may be used by the control unit 17 to detect whether or not hunting has occurred, to cause a change in the air temperature in the compartment.

Further, in the described embodiment, although the manually operated blower regulating device 22 is used to enable the control unit 17 to decide the timing of a shift from the hunting suppression control mode to the usual displacement control mode, an automatically operated blower regulating device for automatically regulating the operation of the blower fan 9 of the evaporator 8 may be connected to the control unit 17 to output thereto a signal indicating the timing of a shift-in the control mode.

In a further modification, a change in the rotating speed of the drive shaft 14c of the compressor 2 may be used for detecting the operating condition of a car air-conditioner, to thereby determine the timing of the shift of the control mode from the hunting suppression control mode to the usual displacement control mode. A still further modification may be used for detecting a change in the operating condition of a car air-conditioner.

It should be understood that the control of the displacement changing unit including the above described solenoid-operated control valve 11 of the compressor 2 carried out by the control unit 17 may be based on a control theory different from the described PID control theory.

It should be also understood that, according to the present invention, the operation of a continuously variable displacement type refrigerant compressor can be optimumly controlled in compliance with a change in the operating condition of a car air-conditioner in which the compressor is accommodated.

We claim:

1. An apparatus for controlling a displacement changing means of a variable displacement type refrigerating compressor arranged in a car air-conditioning circuit including a refrigerant evaporator for cooling air for air-conditioning a compartment of a car, comprising:

a temperature detecting means for detecting an actual temperature of the air for air-conditioning the compartment of the car;

a temperature setting means for setting a desired temperature of the air for air-conditioning the compartment of the car;

a means for generating an electric signal indicating a change in an operating condition of the air-conditioner circuit; and a control means connected to the temperature detecting means, the temperature setting means, and the means for generating an electric signal indicating a change in an operating condition of the air-conditioner circuit, and provided with a control signal generating means for generating an electric control signal for controlling the operation of the displacement changing means of the variable displacement refrigerant compressor, to thereby control the displacement of the variable displacement refrigerant compressor until the actual temperature of the air detected by the temperature detecting means becomes substantially the same as the desired temperature of the air set by the temperature setting means, wherein the control means comprises:

a hunting detecting means for detecting a hunting in a change of the temperature of the air for air-conditioning the compartment of the car, on the basis of a detection of the actual temperature of the air detected by the temperature detecting means;

a control mode changing means for changing a first control mode in which the control signal generating means generates a first drive signal to control the operation of the displacement changing means of the variable displacement refrigerant compressor under a first predetermined control condition to a second control mode in which the control signal generating means generates a second drive signal to control the operation of the displacement changing means under a second predetermined control condition when the hunting detecting means detects the occurrence of hunting; and a mode restoring means for restoring the second control mode changed by the control mode changing means to the first control mode when the control means is supplied with an electric signal indicating a change in the operating condition of the air-conditioner circuit.

2. The apparatus according to claim 1, wherein said control signal generating means of said control means comprises:

a means for computing a predetermined mathematic equation defined as a function of a difference between the actual temperature detected by said temperature detecting means and the desired temperature set by said temperature setting means, to thereby generate said electric control signal for controlling the operation of said displacement changing means of said compressor, said predetermined mathematic equation consisting of a first term proportional to the difference between the actual and desired temperatures, a second term integrating the difference between the actual and desired temperatures, and a third term differentiating the difference between the actual and desired temperatures, said first through third terms having a settable control constant, respectively.

3. The apparatus according to claim 2, wherein said control means further comprises a memory means for storing said predetermined mathematic equation defined as a function of a difference between the actual temperature detected by said temperature detecting means and the desired temperature set by said temperature setting means.

4. The apparatus according to claim 2, wherein said control mode changing means of said control means changes said control constants of said first through third terms of said predetermined mathematic equation from first predetermined values to second predetermined values when changing from said first control mode to said second control mode.

5. The apparatus according to claim 4, wherein said means for generating an electric signal indicating a change in an operating condition of the air-conditioner circuit comprises a detecting means for detecting a change in an operating condition of a blower unit provided for blowing air cooled by said evaporator into said compartment of said car, and wherein said mode restoring means restores said constants of said first through third terms of said predetermined mathematic equation from said second predetermined values to said first predetermined values when said control means receives an electric signal indicating a detection of said change in the operating condition of the blower unit from said detecting means of said means for generating an electric signal indicating a change in the operating condition of the air-conditioner circuit.

6. The apparatus according to claim 4, wherein said means for generating an electric signal indicating a change in an operating condition of the air-conditioner circuit comprises means for determining that a difference between said actual temperature detected by said temperature detecting means and said desired temperature set by said temperature setting means exceeds a predetermined value, and wherein said mode restoring means restores said constants of said first through third terms of said predetermined mathematic equation from said second predetermined value to said first predetermined values when said control means receives an electric signal indicating a detection of a difference between said actual temperature detected by said temperature detecting means and said desired temperature detected by said temperature setting means, exceeding said predetermined value.

7. The apparatus according to claim 1, wherein said temperature detecting means comprises a temperature detecting device arranged to directly detect an actual temperature of air discharged from said evaporator, said temperature detecting device being connected to said control means to supply a signal indicating said actual temperature of the air discharged from said evaporator to said control means.

8. The apparatus according to claim 1, wherein said temperature detecting means comprises a temperature detecting device arranged to directly detect an actual temperature of air in said compartment of said car.

9. The apparatus according to claim 1, wherein said variable displacement refrigerant compressor comprises a variable displacement wobble plate type compressor having a wobble plate assembly received in a crankcase chamber for changing strokes of compression pistons in response to a change in a pressure level within said crankcase chamber, and wherein said displacement changing means comprises a solenoid-operated control valve means for changing said pressure level within said crankcase chamber.

10. The apparatus according to claim 9, wherein said electric control signal generated by said control signal generating means changes a duty ratio of operation of said solenoid-operated control valve means.

* * * * *